(12) United States Patent
Park

(10) Patent No.: US 6,400,685 B1
(45) Date of Patent: Jun. 4, 2002

(54) HETEROGENOUS TRAFFIC CONNECTION ADMISSION CONTROL SYSTEM FOR ATM NETWORKS AND A METHOD THEREOF

(75) Inventor: Si-Woo Park, Kyoungki-do (KR)

(73) Assignee: Hyundai Electronics Ind. Co. Ltd. (KR)

( * ) Notice: Subject to any disclaimer, the term of this patent is extended or adjusted under 35 U.S.C. 154(b) by 0 days.

(21) Appl. No.: 09/057,263

(22) Filed: Apr. 8, 1998

(30) Foreign Application Priority Data

Apr. 18, 1997 (KR) ............................................. 97-14476

(51) Int. Cl.[7] ............................................... G01R 31/08
(52) U.S. Cl. ...................................................... 370/232
(58) Field of Search ................................. 370/230, 231, 370/232, 233, 234, 353, 354, 352; 709/224, 225, 226, 232, 233, 234, 235

(56) References Cited

U.S. PATENT DOCUMENTS

| 4,984,264 A | * | 1/1991 | Katsube ....................... 379/197 |
| 5,267,232 A |   | 11/1993 | Katsube et al. ............. 370/230 |
| 5,442,624 A |   | 8/1995 | Bonomi et al. .............. 370/231 |
| 5,583,857 A | * | 12/1996 | Soumiya et al. ............. 370/233 |
| 5,982,750 A | * | 11/1999 | Tabe et al. .................... 370/233 |
| 6,028,840 A | * | 2/2000 | Worster ....................... 370/230 |
| 6,046,981 A | * | 4/2000 | Ramamurthy et al. ...... 370/232 |
| 6,097,722 A | * | 8/2000 | Graham et al. ............. 370/395 |

* cited by examiner

Primary Examiner—Min Jung
(74) Attorney, Agent, or Firm—Saliwanchik, Lloyd & Saliwanchik

(57) ABSTRACT

A heterogeneous traffic Connection Admission Control system in Asynchronous Transfer Mode (ATM) networks and a method therefor, dynamically controls a system capacity to a delay demand bound of a heterogeneous traffic class in order to meet a cell loss rate for an user's demand,. reduce the influence of mutual traffic interferences and enable the Connection Admission Control in a real time, in a manner that an equivalent band width of each traffic class is calculated using a distribution function of the number of cell estimated through the traffic measurement of each of class, a capacity of a transferring channel is determined in proportion to the equivalent bandwidth calculated upon the connection request of a new call; and the link capacity determined above is compared with the results of the maximum cell rate of the call requesting the new call plus the equivalent bandwidth of all classes.

4 Claims, 2 Drawing Sheets

HETEROGENOUS TRAFFIC CONNECTION ADMISSION CONTROL SYSTEM FOR ATM NETWORKS AND A METHOD THEREOF

BACKGROUND OF THE INVENTION

(1) Field of the Invention

The present invention is related to providing a heterogeneous traffic Connection Admission Control system for Asynchronous Transfer Mode (ATM) networks and a method thereof, for dynamically controlling a system capacity to a delay demand bound of a heterogeneous traffic class in order to meet the cell loss rate for a user's demand, reduce the influence of mutual traffic interferences and enable the Connection Admission Control to function in a real time.

(2) Description of the Related Art

An ATM network for realizing the broadband network such as a Broadband- Integrated Digital Service Network (B-ISDN) can generally provide a multimedia service of various traffic characteristics, including data, voice and image. The ATM network is supposed to control the traffic input thereof in order to service such a variety of signals as a voice sensitive to delay and a video sensitive to the cell loss respectively. The main aim of the operation of the communication network is to handle problems of an acceptable bound exceeding the network capacity, a partial loss and failure of the network by maximizing the network efficiency. The ATM network is provided with an efficient network controller to control a traffic network, effectively, even if the exact characteristics of traffic signal sources are unknown and/or the Quality-Of-Service is changed according to the elapse of time.

Generally, a Connection Admission Control (CAC) means serial actions to determine whether a Virtual Channel Connection (VCC) or a Virtual Path Connection (VPC) has obtained approval to have a connection at a call establishing phase or a renegotiation phase of call. The connection admission control is a software function to determine whether an ATM switch allows or rejects the connection demand. The connection demand is defined as a source traffic parameter and a requested Quality-of-Service (QOS) degree. In order to operate the Connection Admission Control, there are methods using an equivalent bandwidth, a burst model and a traffic measurement.

The equivalent bandwidth method comprises steps for approximating a bit rate generated at a multi-connection with a fluid-flow model, calculating the equivalent bandwidth of respective calls and determining whether the connection is admitted after checking if the equivalent bandwidth exceeds the residue bandwidth of the connection demand call. The burst model method is for controlling the connection admission using only a maximum bit rate and an average bit rate irrespective of the on-off regional distribution of a cell reaching process.

Referring to FIG. 1, a conventional Connection Admission Control system in an ATM network has an acceptable connection admission as follows:

One subscriber terminal 1 reports the Quality-Of-Service degree representing a traffic descriptor, a cell transmission delay and a cell loss rate to the ATM network 3 in the form of a signal message. A Connection Admission Control portion 2 checks the information reported and current load status in the ATM network 3 and then determines whether or not a new connection admission is acceptable. Herein, the traffic descriptor means the description of all traffic characteristics such as the maximum cell rate, the average cell rate, the burstiness and the shapes of signal resources (voice, image).

On the other hand, when the new connection admission is accepted as a result of the decision of its request, the Connection Admission Control portion 2 informs the connection admission to the subscriber terminal 1 and the ATM network 3 so that the subscriber terminal 1 is connected to the ATM network 3. The ATM network 3 includes a multiplexer/reverse-multiplexer 3a for multiplexing a signal from the subscriber terminal 1, reverse-multiplexing data transferred from another subscriber terminal 4 and transferring reverse-multiplexed data to the subscriber terminal 1; a multiplexer/reverse-multiplexer 3b for multiplexing data from the other subscriber terminal 4, reverse-multiplexing data transferred from the one terminal 1 and transferring reverse-multiplexed data, to the other subscriber terminal 4; public switches 3c and 3d for performing mutual data transmissions between the multiplexer/reverse-multiplexers 3a and 3b. Therefore, when the Connection Admission Control portion 2 allows the connection admission to the subscriber terminal 1, data from the subscriber terminal 1 is multiplexed and reverse-multiplexed at the multiplexer/reverse-multiplexer in turn and then transferred to the other subscriber terminal 4, while data from the other subscriber terminal A is multiplexed and reverse-multiplexed at the multiplexer/reverse-multiplexer in turn and then transferred to the one subscriber terminal 1, thereby performing the mutual communication between terminals. The Connection Admission Control system also controls the connection admission using methods of an equivalent band width, a burst model and traffic measurements.

But, the Connection Admission Control method using the equivalent bandwidth has difficulty in calculating the exact equivalent bandwidth of an individual call in advance. The Connection Admission Control method using the traffic measurement has a problem in reducing the link use efficiency if the number of the traffic class is greater or lesser. The Connection Admission Control method using the burst model is simple because of controlling a connection admission using only a maximum bit rate and an average bit rate irrespective of the on-off regional distribution of a cell reaching process, but it has a problem in that the calculation of the maximum bit rate and average bit rate becomes complex under the heterogeneous traffic environment.

In order to resolve these problems and overcome these disadvantages, an object of the invention is to provide a heterogeneous traffic Connection Admission Control system in ATM networks for dynamically controlling a system is capacity to a delay demand bound of a heterogeneous traffic class in order to meet a cell loss rate for an user's demand, reduce the influence of mutual traffic interferences and enable the Connection Admission Control in a real time.

The other object of the invention is to provide a heterogeneous traffic Connection Admission Control method in ATM networks for dynamically controlling a system is capacity to a delay demand bound of a heterogeneous traffic class in order to meet a cell loss rate for an user's demand, reduce the influence of mutual traffic interferences and enable the Connection Admission Control in a real time.

SUMMARY OF THE INVENTION

According to the invention, a heterogeneous traffic Connection Admission Control system in ATM networks comprises: a Connection Admission Control means for determining whether the connection admission is acceptable based on a maximum cell rate obtained by the combination of equivalent bandwidths calculated by each of a Connection Admission Controller upon the connection request of calls input into respective connection node; a bandwidth allotting means for determining a service capacity of each class in proportion of the equivalent bandwidth of each traffic class to the summing up of all traffic classes inputted into the Connection Admission Control means; means for temporally storing ATM cells through the Connection Admission Control means; and a server for fetching the ATM cell of each class from the storing means and transferring it through a transferring channel.

Also, a heterogeneous traffic Connection Admission Control method in ATM networks comprises steps of calculating an equivalent band width of each traffic class using a distribution function of the number of cells estimated through the traffic measurement of each class; determining the capacity of a transferring channel in proportion to the calculated equivalent bandwidth upon the connection request of a new call; and comparing the link capacity determined above with the results of summing up the maximum cell rate of the call requesting the new call to the equivalent bandwidth of all classes.

BRIEF DESCRIPTION OF THE DRAWINGS

The invention now will be described below in detail with reference to the accompanying drawings, in which.

DESCRIPTION OF THE PREFERRED EMBODIMENTS

Figure 1:
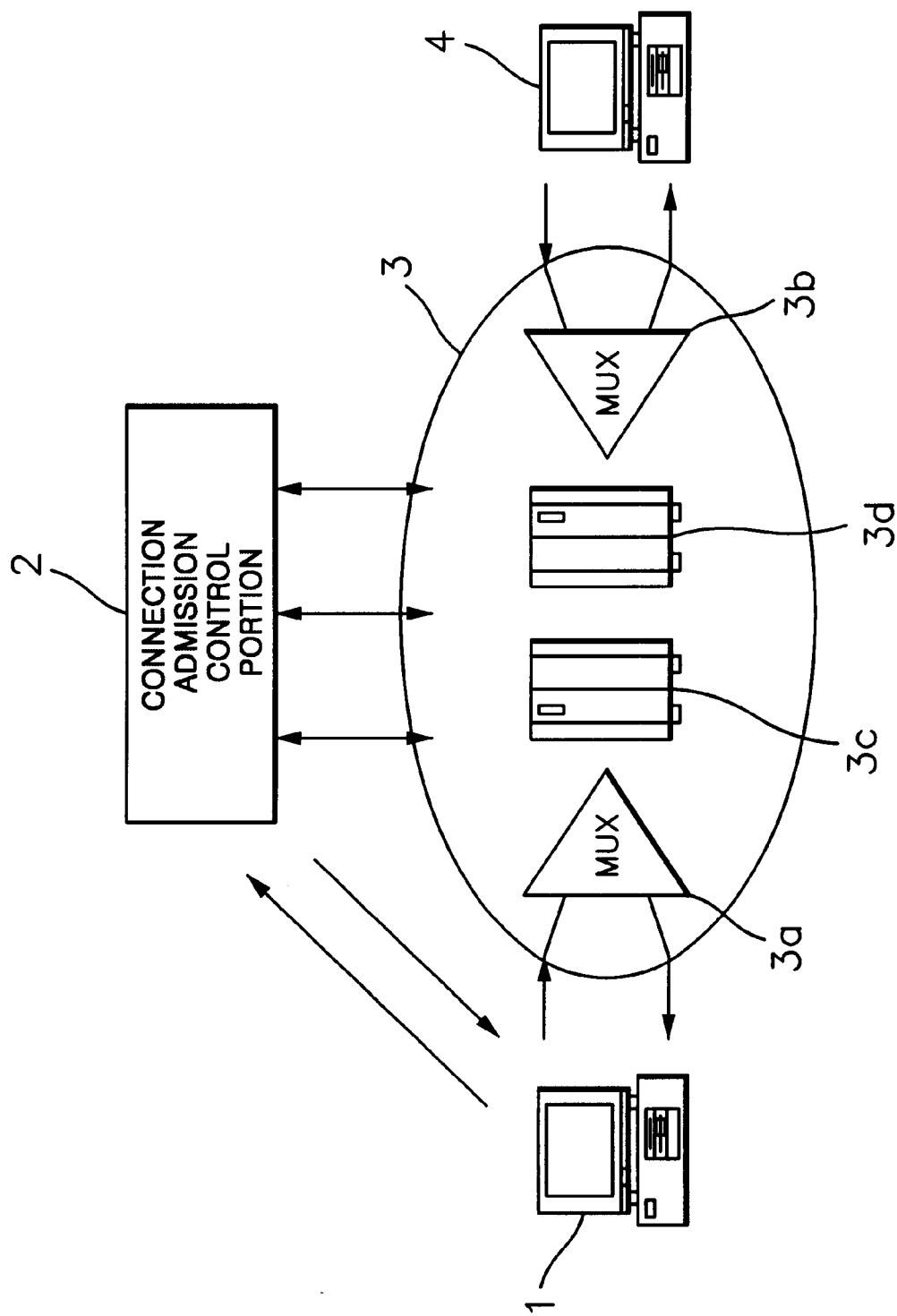
FIG. 1 is a view illustrating the schematic configuration of a conventional Connection Admission Control system in an ATM network; and, FIG. 2 is a view illustrating the configuration of the heterogeneous traffic Connection Admission Control system according to the invention.
Figure 2:
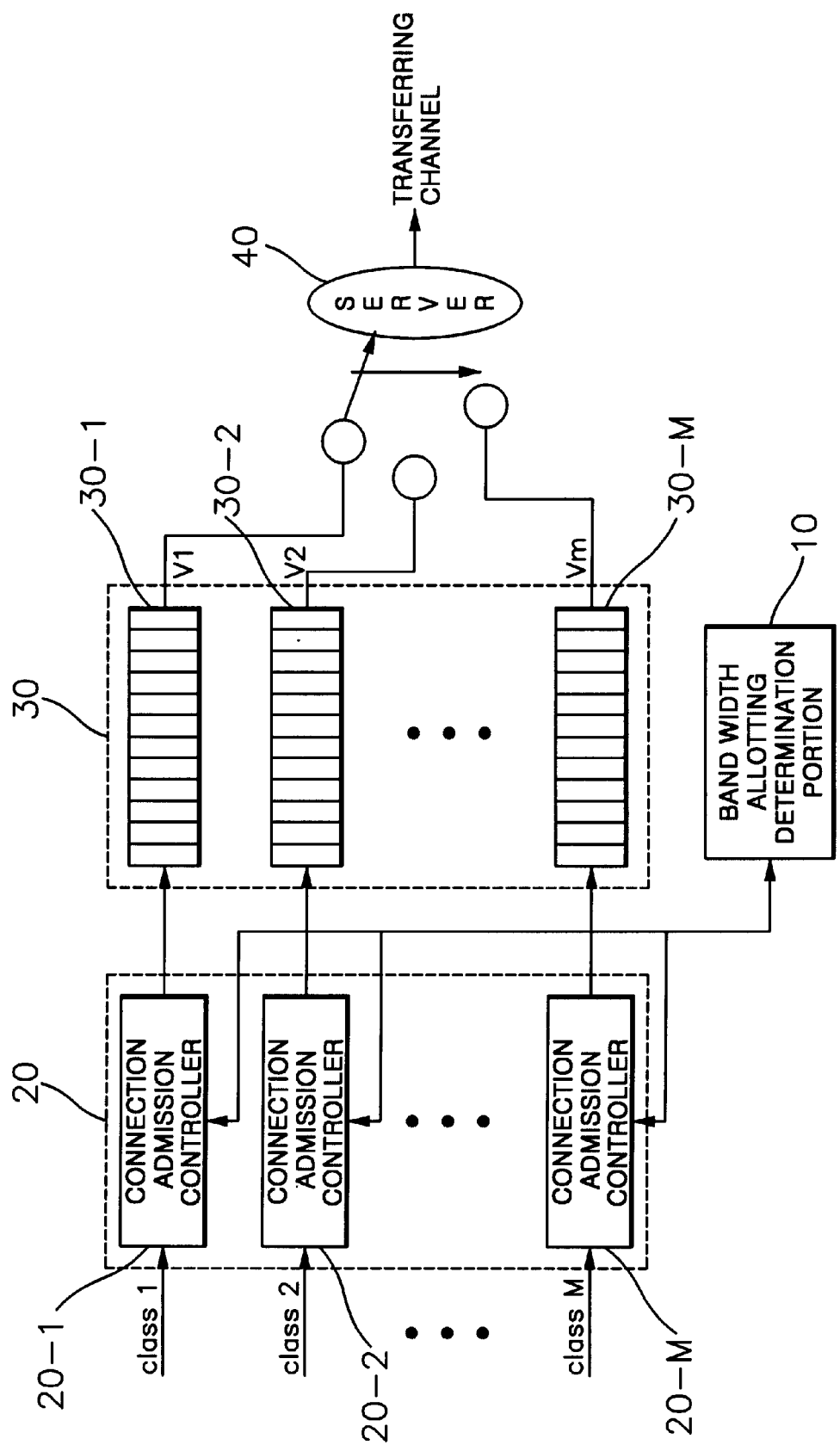

Referring to FIG. 2, a heterogeneous traffic Connection Admission Control system in ATM networks comprises a bandwidth allotting determination portion 10 for determining a service capacity of each class in proportion to the equivalent bandwidth of each traffic class relative to the summing up of all traffic classes; a Connection Admission Control portion 20 for determining whether the connection admission is acceptable based on the combination of equivalent bandwidths calculated by each Connection Admission Controller upon the connection request of calls input into respective connection node and controlling a bandwidth allotting according to the service capacity obtained by the bandwidth allotting determination portion 10; a buffer portion 30 for temporally storing ATM cells through the Connection Admission Control portion 20; and a server 40 for fetching the ATM cell of each of class from the buffer portion 30 and transferring it through a transferring channel.

The Connection Admission Control portion 20 includes a plurality of Connection Admission Controllers 20-1 - - - 20-M connected in parallel to one another in order to meet the Quality-Of-Service demand of each class in case of being adapted to a heterogeneous traffic control system and enhance its use efficiency. The buffer portion 30 includes a plurality of buffers 30-1 - - - 30-M to be respectively corresponded to a plurality of Connection Admission Controllers 20-1 - - - 20-M in the Connection Admission Control portion 20.

The heterogeneous traffic Connection Admission Control system in ATM networks is operated as follows:

Firstly, traffic classes class 1 - - - class M are input through each connection node into Connection Admission Controllers 20-1 - - - 20-M in a Connection Admission Control portion 20, in which the traffic class includes parameter characteristics such as a maximum cell rate and an average cell rate of a traffic cell and a cell delay bound time and cell loss rate which are considered as a Quality-Of-Service request condition. The Connection Admission Control portion 20 stores introduced ATM cells generated by the call of corresponding class every predetermined period to calculate the equivalent bandwidth of each class. Thereafter, if the connection of a new call is requested, the Connection Admission Control portion 20 compares summing up the sum of the equivalent bandwidths calculated by the Connection Admission Controllers of other classes to the equivalent bandwidths of corresponding classes with the link capacity obtained by a bandwidth allotting determination portion 10. If the summed up value is less than the link capacity, the connection request is allowed. Otherwise, if the summed up value is greater than the link capacity, the connection admission is rejected.

The link capacity is established at the bandwidth allotting determination portion 10 as follows:

An output service capacity of the cells in each class is changed every time the termination of an updating period that the equivalent bandwidth is updated. Each class is provided with an independent call admission controller and a buffer at a network connection node. Thus, the link capacity is determined by a service capacity of class I in proportion to the substantial traffic equivalent bandwidth used in class I through a call connected on a distribution function of the number of cells measured by a call admission controller of any traffic class I.

The service capacity reflects the dynamic change of a traffic flow and is divided into a reasonable capacity in transferring cells at a server 40, considering the co-relationship of an other class. The summing up of the service capacities of all classes is equal to the link capacity. The equivalent bandwidth of traffic class I is obtained based on the distribution function of the number of cells which is measured every predetermined updating period by the Ith Connection Admission Controller in network connection node. Thus, the service capacities of not only other classes but also the Ith traffic class are updated.

The traffic characteristics of specific class affects on the Quality-Of-Service of other class traffic in ATM networks managing the heterogeneous traffic. In order to minimize the interference, the virtual capacity of the other classes is also divided into a reasonable capacity for the traffic dynamically changed as described above. Herein, the equivalent bandwidth is considered as a model with no buffer and is calculated based on a distribution function of the number of cells, which is estimated by measuring the number of cells introduced at the updating period time of each traffic class.

On the other hand, if the Connection Admission Control portion 20 accepts the connection of a call requesting a new call, the buffer portion 30 stores the ATM cell of each class through each of the Connection Admission Controllers 20-1 - - - 20-M. The size of each of the buffers 30-1 - - - 30-M in the buffer portion 30 is changed for the service capacity to dynamically meet the delay bound requested by each traffic class as it changes at every updating time period . In other words, the M call admission controllers are independently allotted to every traffic class. The QI cell sized buffer is allotted to the Ith traffic class. The size QI of the buffer must be established so that the maximum delay time at an output terminal meets the delay demand bound requested by a user. Herein, QI means the size of the buffer that is dynamically changed and allotted to the Ith traffic class.

Even through the size QI of the buffer is allotted in a predetermined size at the time of constructing a network, the service capacity is changed at every predetermined interval of a call holding period time. Therefore, because the maximum delay at the output buffer is also changed, the buffer size is dynamically changed so that the delay bound to be requested for every traffic class may meet the service capacity changed per each updating period.

Assuming that the substantial buffer size is QI and the service capacity VI is bestowed to the Ith traffic class, then the maximum delay time at the output buffer is QI/VI. As the output capacity is changed, the maximum delay time is also varied. It is concerned that the maximum delay time might exceed a user's delay bound demand value. For it the buffer size QI, is subject to be dynamically controlled at every predetermined time interval. Thus, at the starting time of the updating period, it is necessary to control the buffer correspondingly to two cases.

First, in case that the user's delay demand bound time to be requested at the Ith traffic class is larger than the maximum delay at the output buffer, even if the virtual capacity change, because the maximum delay time of cells generated at the output buffer by calls connected to the Ith traffic class is less than the user's delay demand one to meet the delay demand condition, it is not necessary to control the buffer.

Second, in case that the maximum delay time is larger than the user's delay demand bound one, the buffer size is controlled to meet the delay of the traffic class, as the user's delay bound demand is exceeded at the output buffer. At that time, the buffer size to be controlled should be equal to D(I)*V(I) (Only, D(I) is the user's delay bound demand time requested for the Ith traffic class). The buffer size is re-controlled in proportion to the service capacity to reflect the user's delay demand bound, so that the traffic volume is considered for a system design, in which the traffic volume is changed at every predetermined interval time period by calls of class I. Therefore, in order to meet the delay demand condition relating to the service capacity, the dynamic re-controlling of the buffer size prevents a thing in advance which the maximum time of the buffer exceeds the user's delay demand one generated at the output buffer.

On the other hand, under the condition that ATM cells are stored at each of the buffers 30-1 - - - 30-M to the degree that the buffer size is controllable, in accordance with the service capacity established at the bandwidth allotting determination portion 10, the server 40 fetches the cells stored at the buffers in round robin mode and transfers them to transfer channels.

As described above, in case of a heterogeneous traffic system, the invention comprises Connection Admission Controllers constructed in parallel. to one another in order to meet the Quality-Of-Service demand of each class and enhances the network use efficiency. The equivalent bandwidth of each traffic class is calculated using a distribution function of the number of cells estimated through the traffic measurement. When a new call connection is requested, if the summing up of the maximum cell rate of the cell requested and the equivalent bandwidth of all classes is less than the link capacity, the connection request is accepted. Otherwise, if the summing up of the maximum cell rate of the cell requested and the equivalent bandwidth of all classes is larger than the link capacity, the connection request is rejected.

Therefore, the invention has advantages in that the equivalent bandwidth is considered as a model with no buffer, which is calculated based on a distribution function of the number of cells, which is estimated by measuring the substantial cell flow introduced into the network connection node, whereby the upper bound of the user's cell loss demand can have a spare portion.

The invention gets a user to define the call parameters at the user's connection setting phase by using only the maximum cell rate as a parameter of a Connection Admission Control, so that the real time control of the connection admission is possible.

The invention also meets the user's demand cell loss rate by controlling the system capacity relating to the cell delay demand bound of a heterogeneous class and removes the interference between traffics.

What is claimed is:

1. A heterogenous traffic Connection Admission Control system in ATM network comprising:

Connection Admission Control means having a plurality of Connection Admission Controllers connected in parallel each for calculating equivalent bandwidths corresponding to each traffic class of calls introduced through ATM network nodes interconnected with each of said Connection Admission Controllers, transmitting the equivalent bandwidths to bandwidth allotment determining means and controlling the Connection Admission of the input calls in accordance with bandwidths of the traffic classes received from the bandwidth allotment determining means;

bandwidth allotment determining means for calculating a traffic class service capacity of the plurality of Connection Admission Controllers based on the equivalent bandwidth provided respectively from the Connection Admission Controllers and providing acceptable bandwidths of the Connection Admission to the plurality of Connection Admission Controllers respectively in response to the calculation result thereof;

storage means for temporally storing ATM cells output from the plurality of Connection Admission Controllers by using a plurality of buffers connected with their corresponding Connection Admission Controllers;

a server for transmitting ATM cells stored in the plurality of buffers of the storing means in round robin mode via a transferring channel.

2. The heterogenous traffic Connection Admission Control system in ATM network as claimed in claim 1, in which:

said Connection Admission Controllers calculates the equivalent bandwidth of the input traffic class using a distribution function of the number of cells which is estimated by determining a traffic introduced into a network node.

3. The heterogenous traffic Connection Admission Control system in ATM network as claimed in claim 1, in which:

the sizes of the plurality of buffers are changed dynamically to meet a delay bound requested by each traffic according to a service capacity which is changed at every updating period time.

4. The heterogenous traffic Connection Admission Control system in ATM network as claimed in claim 2, in which:

the sizes of the plurality of buffers are changed dynamically to meet a delay bound requested by each traffic according to a service capacity which is changed at every updating period time.

* * * * *

UNITED STATES PATENT AND TRADEMARK OFFICE
CERTIFICATE OF CORRECTION

PATENT NO. : 6,400,685 B1
DATED : June 4, 2002
INVENTOR(S) : Si-Woo Park

It is certified that error appears in the above-identified patent and that said Letters Patent is hereby corrected as shown below:

Title page,
Item [57], ABSTRACT,
Line 5, "demand,. reduce" should read -- demand, reduce --.

Column 1,
Line 22, "loss respectively." should read -- loss, respectively. --.

Column 5,
Line 52, "parallel. to" should read -- parallel to --.

Signed and Sealed this

Nineteenth Day of November, 2002

*Attest:*

JAMES E. ROGAN
*Attesting Officer*     *Director of the United States Patent and Trademark Office*